United States Patent [19]

Sasaki et al.

[11] Patent Number: 4,606,144

[45] Date of Patent: Aug. 19, 1986

[54] MONOFILAMENT OF IMPROVED VINYLIDENE FLUORIDE-BASED RESIN

[75] Inventors: Tohru Sasaki; Kunizoh Kidoh; Hiroyuki Endoh, all of Iwaki, Japan

[73] Assignee: Kureha Kagaku Kogyo Kabushiki Kaisha, Nihonbashi, Japan

[21] Appl. No.: 697,869

[22] Filed: Feb. 4, 1985

Related U.S. Application Data

[63] Continuation-in-part of Ser. No. 438,362, Oct. 18, 1982, abandoned, which is a continuation-in-part of Ser. No. 213,220, Dec. 5, 1980, abandoned, which is a continuation of Ser. No. 70,123, Aug. 27, 1979, abandoned, which is a continuation-in-part of Ser. No. 3,861, Jan. 16, 1979, abandoned.

[30] Foreign Application Priority Data

Jan. 31, 1978 [JP] Japan .................... 53-9737

[51] Int. Cl.$^4$ .................... A01K 91/00; D02G 3/00
[52] U.S. Cl. .................... 43/44.98; 428/364; 525/199
[58] Field of Search .................... 428/364, 359; 525/199, 525/169; 526/255; 264/210.7; 43/44.98

[56] References Cited

U.S. PATENT DOCUMENTS

| | | | |
|---|---|---|---|
| 3,324,069 | 6/1967 | Koblitz .................... | 525/199 X |
| 3,340,222 | 9/1967 | Fang .................... | 525/199 X |
| 3,541,039 | 11/1970 | Whiton .................... | 525/199 X |
| 3,925,339 | 12/1975 | Ishii et al. .................... | 526/255 |
| 3,941,860 | 3/1976 | Couchoud et al. .................... | 525/199 |
| 4,141,873 | 2/1979 | Dohany .................... | 428/500 |
| 4,302,556 | 11/1981 | Endo et al. .................... | 264/210.7 |

Primary Examiner—Lorraine T. Kendell
Attorney, Agent, or Firm—Wegner & Bretschneider

[57] ABSTRACT

A flexible monofilament of at least 0.08 mm in diameter excellent in transparency, high in impact strength and durability and showing a tensile strength of not less than 30 kg/mm$^2$ and a modulus of elasticity of 60 to 120 kg/mm$^2$, which is essentially composed of a vinylidene fluoride-based resin, a polymeric substance and a polyester plasticizer and is prepared by the process comprising the steps of:

melt-spinning of a resin composition comprising essentially of 100 parts by weight of said vinylidene fluoride based resin selected from homopolymers of vinylidene fluoride and copolymers thereof; 5 to 15 parts by weight of said polymeric substance selected from homopolymers of methyl acrylate, copolymers comprising at least 85% by weight of methyl acrylate units and at most 15% by weight of isobutylene units and mixture thereof; and 2 to 7 parts by weight of said polyester plasticizer selected from the group consisting of polyesters of 1,100 to 5,000 in molecular weight obtained from an alcohol of 4 to 7 carbon atoms and a carboxylic acid of 4 to 8 carbon atoms and polyesters of 1,500 to 4,000 in molecular weight obtained from a dihydric alcohol of 2 to 4 carbon atoms and a dicarboxylic acid of 4 to 6 carbon atoms, thereby obtaining an unstretched monofilament, stretching the thus obtained unstretched monofilament in a heating medium, and subjecting the thus stretched monofilament to relaxation thereby obtaining said flexible monofilament.

14 Claims, No Drawings

MONOFILAMENT OF IMPROVED VINYLIDENE FLUORIDE-BASED RESIN

CROSS-REFERENCE TO RELATED APPLICATION

The present application is a continuation-in-part of application Ser. No. 438,362 filed Oct. 18, 1982, now abandoned, which is a continuation-in-part of application Ser. No. 213,220 filed Dec. 5, 1980, now abandoned, which is a continuation of application Ser. No. 70,123 filed Aug. 27, 1979, now abandoned, which is a continuation-in-part of application Ser. No. 3,861 filed Jan. 16, 1979, now abandoned.

DETAILED DESCRIPTION OF THE INVENTION

The present invention relates to a monofilament formed from a vinylidene fluoride resin composition, and more particularly it relates to such monofilament provided with good flexibility maintainable for a long time and strong impact strength while retaining the advantageous properties such as large specific gravity, high tensile strength and excellent transparency, so that such a monofilament may be ideally used as a fishing line.

In more detail, the present invention relates to a flexible monofilament of at least 0.08 mm in diameter excellent in transparency, high in impact strength and durability and showing a tensile strength of not less than 30 kg/mm$^2$ and a modulus of elasticity of 60 to 120 kg/mm$^2$, which is essentially composed of a vinylidene fluoride-based resin, a polymeric substance and a polyester plasticizer and is prepared by the process comprising the steps of:

melt-spinning of a resin composition comprising essentially of 100 parts by weight of said vinylidene fluoride based resin selected from homopolymers of vinylidene fluoride and copolymers thereof; 5 to 15 parts by weight of said polymeric substance selected from homopolymers of methyl acrylate, copolymers comprising at least 85% by weight of methyl acrylate units and at most 15% by weight of isobutylene units and mixture thereof; and 2 to 7 parts by weight of said polyester plasticizer selected from the group consisting of polyesters of 1,100 to 5,000 in molecular weight obtained from an alcohol of 4 to 7 carbon atoms and a carboxylic acid of 4 to 8 carbon atoms and polyesters of 1,500 to 4,000 in molecular weight obtained from a dihydric alcohol of 2 to 4 carbon atoms and a dicarboxylic acid of 4 to 6 carbon atoms, thereby obtaining an unstretched monofilament, stretching the thus obtained unstretched monofilament in a heating medium, and subjecting the thus stretched monofilament to relaxation thereby obtaining said flexible monofilament.

There is a wide selection in size of the monofilaments used as a fishing line, ranging from #0.3 filaments with average diameter of 90 microns to #120 filaments with average diameter of 1.85 millimeters, and nylon filaments are prevalently used. As is well known, the nylon filament has many excellent properties for use as the fishing line such as high tensile strength and suitable flexibility, but on the other hand, it has certain drawbacks such as a tendency to absorb water with resultant reduced tensile strength, rather poor durability and small specific gravity. Particularly, the small specific gravity of the nylon monofilament is a serious drawback for the fishing line because the fishline tends to float up to the water surface and is slow to sink under water so that such fishlines are likely to get entangled together and unable to reach the aimed-at fishing place quickly. Such difficulties become most manifest when the nylon filament is used for the ultra-thick monofilament fishline, generally referred to as "tsurimoto" (a Japanese word indicating a line of 3-5 m in length directly tied to a fishing hook) or "sekiyama" (a Japanese word indicating a line of 10-15 m in length which connects "tsurimoto" and another line of 10-15 m in length, employed for the longline fishing of tunas.

There have been used the three-ply steel wire strands as "sekiyama" and "tsurimoto" fishline for the long-lining, but because of their difficulties in treatment such as aptness to have a kink, too much heaviness, non-resistance to rust, etc. they were superseded by the three-ply strands of #40 nylon filaments. The three-ply nylon strands are easy to manipulate owing to their high flexibility peculiar to the synthetic resins and also allow an increased catch rate which appears to be attributable to transparency of nylon. Thus, "sekiyama" and "tsurimoto" fishlines are now mostly made of three-ply nylon strands, especially #120 nylon monofilaments.

The fishermen praise this #120 monofilament for its better surface smoothness and transparency, even higher catch rate and greater ease of manipulation than the three-ply strands.

However, because of its small specific gravity, usually 1.13 to 1.15, such nylon monofilament-fishline when cast into the sea tends to float up to the surface of the sea and get entangled and is also unable to quickly reach the swimming depths of tuna, usually 40 to 50 meters below the sea level, so that such nylon fishline can not give full play to the advantages credited to the super-thick monofilament. Further, in tuna long-lining, the fishline is left in the sea water for from several hours to a whole day and night, so that the tensile strength of the fishline is reduced by as much as 10 to 40% due to the water absorption of nylon. Thus, such nylon monofilament rather lacks reliability as a fishline.

The present inventors have made further studies for making a monofilament-fishing line which is free of said defects by making the most of the advantages of nylon filament, that is, good flexibility, excellent transparency and high catch rate, and as a result, succeeded in working out a quite novel, ideal fishing line with excellent transparency, high tensile strength, high impact strength and durability, good flexibility and increased sinking rate.

The monofilament according to the present invention is prepared by melt-spinning a compound consisting of 100 parts by weight of vinylidene fluoride-based resin 5 to 15 parts by weight of polymethyl acrylate and/or a copolymer of methyl acrylate and isobutylene containing at most 15% by weight of isobutylene units and 2 to 7 parts by weight of a polyester plasticizer and then by subjecting the thus melt-spun monofilament to thermal stretching, the monofilament being free from bubbles therein, excellent in tensile strength, flexibility, transparency and durability for a long term and showing a favorable specific gravity to be used as a fishing line.

Generally, vinylidene fluoride-based resins have high crystallizability and strong intermolecular cohesion, so that the stretched filament is firm with a modulus of elasticity amounting to 250 to 350 kg/mm$^2$. Therefore, although no serious problem arises in handling of lines in the case of a fine filament, great difficulties are encountered in handling the ultra-thick monofilaments with a diameter larger than 0.8mm such as used for longline fishing of tunas.

Polyblending of compatible plasticizers or other polymers is known as a means for providing flexibility to the filaments, but the vinylidene fluoride resins such as above-mentioned are poor in adhesiveness and blendability with plasticizers, other polymers, assistants, etc., and can not be easily mixed with these materials to give good compatibility.

The plasticizers having the practical compatibility with vinylidene fluoride-based resin are shown only in U.S. Pat. No. 3,541,039 and Japanese Patent Laid-Open No. 111,147/75. The former describes a polyester resin having a molecular weight of 1,100 to 5,000 and composed of an acid with a carbon number of 4 to 8 and an alcohol with a carbon number of 4 to 7, while the latter describes a polyester having a molecular weight of 1,500 to 4,000 and composed of a dialcohol with a carbon number of 2 to 4 and a dicarboxylic acid with a carbon number of 4 to 6, wherein the terminal monomer unit is a monovalent alcohol or monovalent acid with a carbon number of 1 to 3.

Whereas, the flexibility which is intended to provide in the present invention, when expressed in terms of a modulus of elasticity, is necessarily 60 to 120 kg/mm$^2$ and in order to obtain such a range of modulus of elasticity, it is necessary to mix the polyester-plasticizer.

Addition of the plasticizer in an amount of not less than 7 parts by weight can not prevent the entrainment of bubbles into the filament in the step of extrusion, and that in an amount of more than 10 parts by weight can cause exudation of the plasticizer with the passage of time even if such a plasticizer is of the type having good compatibility with the vinylidene fluoride-based resin, and also the tensile strength of the filament drops too much to stand the practical use. Needless to say, a high tensile strength is required for long-lining of tunas, and usually it is necessary for the fishline used for such long-lining to have a tensile strength of higher than 30 kg/mm$^2$. On the other hand, as for the resins having a good compatibility with the vinylidene fluoride resins, the methyl methacrylate resin proposed in Japanese Patent Publication No. 12012/70, and the methyl acrylate resin and the copolymer resin of methyl acrylate and isobutylene both proposed in Japanese Patent Application Laid Open Nos. 116538/75, 116582/75, and 116583/75 have been known as a few exceptions.

However, such a polymethyl methacrylate resin has a high glass-transition temperature, Tg, of 80°–100° C., as compared to Tg ($-38°$ C.) of polyvinylidene fluoride, so that the polyblends of these resins become hard and fragile with aging and can not make the filament flexible.

In addition, although a monofilament having a modulus of elasticity of not more than 120 kg/mm$^2$ is obtainable by the usual process when extruding a blend consisting of more than 30 parts by weight of a methyl acrylate resin or a copolymer resin of methyl acrylate and isobutylene is compounded with 100 parts by weight of a vinylidene fluoride resin, there appear two drawbacks that the reduction of tensile strength of the obtained monofilament is more conspicuous than in the case where plasticizer with a good compatibility is used and the entrainment of bubbles in the filament is unavoidable in the step of producing the filament.

The higher the tensile strength of a fishline, the better, and it is essential to minimize the reduction of tensile strength resulting from the bestowal of flexibility. Accordingly the just mentioned method of blending could not fulfill the aim of the present invention. It has been found out by the present inventors that it is possible to produce a filament with a modulus of elasticity of not more than 120 kg/mm$^2$ without any entrainment of bubbles and nevertheless, without any exudation of the plasticizer, with a minutely reduced tensile strength and a greatly improved impact strength, by the combined use of a polyester plasticizer with a methyl acrylate resin and/or a copolymer resin of methyl acrylate and isobutylene at a specified range of combining ratio.

In order to produce a filament with a modulus of elasticity in the range of 60 to 120 kg/mm$^2$, and a tensile strength of more than 30 kg/mm$^2$, the aim of the present invention, 5 to 15 parts by weight, of the resin of a methyl acrylate polymer or copolymer and 2 to 7 parts by weight of the polyester plasticizer are blended with 100 parts by weight of the vinylidene fluoride based resin.

In addition, the combination of the acrylate resin and the polyester plasticizer has an effect of increasing the fluidity of the polyblend resin in spinning resulting in an improvement of processability.

Further, it is preferable to have a larger amount of the blended acrylate resin than that of the blended plasticizer, preferably by more than 2 times in the range of the ratio of the additives to the vinylidene fluoride based resin in order to have a filament with a conspicuously increased impact strength which is another object of the present invention.

Mixing of a vinylidene fluoride-based resin and a polymethyl acrylate resin or a copolymer of methyl acrylate and isobutylene may be accomplished by mechanical blending in an ordinary blender, but because of its low Tg, such acrylate resins are sometimes in the form of a rubber-like mass and hard to be blended. In such a case, the desired dispersion can be accomplished by so-called intraparticle postpolymerization where an acrylate monomer is absorbed into and polymerized within the vinylidene fluoride-based resin particles. The amount of polymerized acrylate formed from the absorbed acrylate monomer in the vinylidene fluoride-based resin particles becomes 150 parts by weight to 100 parts by weight of the vinylidene fluoride-based resin in the case where the vinylidene fluoride-based resin was obtained by suspension polymerization, and by using the vinylidene fluoride-based resin and the thus obtained polymer particles based on vinylidene fluoride-based resin having polymerized acrylate the desired dispersion of and mixing of the acrylate resin and the vinylidene fluoride-based resin can be accomplished at any desired rate in an ordinary blender.

The vinylidene fluoride-based resin composition according to this invention is melt-spun and then hot-stretched in a usual way.

The spinning method for obtaining the filament according to the present invention is described below in detail. The resin composition of this invention plasticized by an extruder is extruded from a nozzle optionally through a gear pump and then quenched.

The temperature of molten resin may be of any value between the melting point (approximately 175° C.) and thermal decomposition temperature (350° C.) of the plasticized resin, but usually it is preferably within the range of 200°–300° C. Water is usually used for effecting the quenching. Such quenching is carried out at a temperature below the level at which no air bubbles are produced by boiling at the interface with the molten resin, preferably below 50° C. The thus crystallized and solidified non-stretched filament is successively preheated in a heating medium at a temperature of 80° to 120° C., then stretched 4.0 to 5.5 times in length within the heating medium at a temperature of 150°-165° C., followed by additional stretching 1.1 to 1.2 times in length within the heating medium at a temperature of 160° to 165° C., and then subjected to a heat treatment for relaxing of 5 to 20% in length in dry heat of 80° to 160° C., followed by winding. The heating medium used in this process is one which has a boiling point of higher than 170° C. and which is chemically inert to the resin composition of the present invention, the examples of such heating media being silicone oil, liquid paraffin, glycerol, etc., but glycerol is preferred as it can be washed away from the stretched filament by water washing. The stretching temperature and the degree of stretch may be suitably selected so as to provide the maximum tensile strength to the filament from the resin composition of the present invention. The stretching rate greatly affects the filament quality and, particularly, tensile strength of the filament. The lower the stretching rate, the greater is the tensile strength provided, but usually such stretching is performed at the rate of 5 to 20 m/min.

The vinylidene fluoride-based resin usable in the present invention is a homopolymer of vinylidene fluoride, a copolymer obtained by polymerizing more than 70% by weight of vinylidene fluoride and at least one monomer which is physically and chemically analogous to the homopolymer, or a blend matter containing mainly the homopolymers or the copolymer. These copolymers containing up to 5 mol % of an haloethylene copolymerizable with monomeric vinylidene fluoride, such as tetrafluoroethylene, monochloro-trifluoroethylene, hexafluoropropylene, vinyl fluoride, etc. are preferably utilized for the purpose of the present invention.

Any polyester plasticizer is optionally utilized in the present invention provided it has a good compatibility to the vinylidene fluoride resins. Among the polyester plasticizers, especially the polyester of molecular weight of 1,500 to 4,000 having ester linkages comprising a dihydric alcohol of carbon number of 2 to 4 and a dicarboxylic acid of carbon number of 4 to 6 as a repeating unit, and having its terminal hydroxyl group protected by esterification with a monocarboxylic acid of carbon number of 1 to 3.

The thus obtained filament has a specific gravity of as large as 1.65 to 1.83 and also has high tensile strength, good flexibility and excellent transparency. Particularly, the filament having a diameter of 0.08 to 2.0 mm, a tensile strength of above 30 kg/mm² and a modulus of elasticity within the range of 60 to 120 kg/mm² can be effectively used for longline fishing of tunas, seabreams, yellow tails, swellfishes, etc.

The present invention is described in further detail by way of some preferred embodiments thereof as the following examples:

EXAMPLE 1

A dispersed polymer was obtained by an intraparticle polymerization of 60 parts by weight of methyl acrylate absorbed into 100 parts by weight of particles of the polyvinylidene fluoride having an inherent viscosity of 1.30 dl/g obtained by suspension polymerization. To 33 parts by weight of this seed polymer were added 79.5 parts by weight of polyvinylidene fluoride to obtain a mixture composed of 100 parts by weight of polyvinylidene fluoride and 12.5 parts by weight of poly(methyl acrylate). To this mixture were added 5 parts by weight of a polyester having a molecular weight of 2,100 and produced by esterification of adipic acid with propylene glycol having its terminal group acetylated, and the thus prepared composition was processed in the form of melt-extruded pellets.

The pellets were melt-spun at a resin temperature of 260° C. by an extruder with a barrel of 30 mm in diameter, quenched in water at 50° C., then stretched 5.2 times in length in glycerol at 160° C., further stretched 1.10 times in length in glycerol at 165° C. and then relaxed 10% in length in hot air at 85° C. to obtain monofilaments with a diameter of 1.75 mm. This monofilament had an excellent transparency and flexibility as well as the following properties: tensile strength of 50 kg/mm²; specific gravity of 1.70; refractive index of 1.44; initial modulus of 120 kg/mm² and an energy at impact rupture of 280 kg.cm.

The energy at impact rupture was determined by the following method:

One end of the specimen of a filament of L cm in length was fixed to a clasp and at the other end of the specimen of a weight (W grams) was attached, and then the weight was thrown downwards by its weight. This procedure was repeated n times with a weight of W grams, and further repeated each n times on the weight of $W + \Delta W_i$, wherein $i = 1, 2, 3 \ldots$, until the specimen breaks. The energy at impact rupture is obtained by the following formula:

$$\text{The energy of impact rupture} = L\left(W_{max} - \Delta W\left(\frac{Nx}{n} - \frac{1}{2}\right)\right)$$

wherein
n = 5,
$W_{max}$: the weight when all the specimen in 5 times of the test were broken, and
Nx: the number of breaking in total test.

As for the underwater sinking property of this filament, it could sink to 2-meter in depth in the sea water within 15 seconds, and no change of tensile strength and extensibility was seen after immersion of the filament in the sea water for full two days.

In comparison with the thus prepared monofilament according to the present invention, the nylon filament of 1.85 mm in diameter commonly used for tuna longlining has a tensile strength of 38 kg/mm², but it took 97 seconds to sink to 2-meter in depth in the sea water and the tensile strength was reduced to 28.5 kg/mm² (25% reduction) after immersion in the sea water for 24 hrs.

EXAMPLE 2

Thirty parts by weight of monomeric mixture of methyl acrylate and isobutylene with the weight ratio of monomeric methyl acrylate to isobutylene of 90:10 were subjected to intraparticle polymerization within 100 parts by weight of particles of polyvinylidene fluoride having an inherent viscosity of 1.30 dl/g obtained by suspension polymerization, to thereby obtain globular particles of polymer.

This polymer was mixed with polyvinylidene fluoride at weight ratio of 43.3/66.7 to obtain a mixture composed of 100 parts by weight of polyvinylidene fluoride and 10 parts by weight of a copolymer of methyl acrylate and isobutylene, and this mixture was further blended with 5 parts by weight of the polyester-plasticizer used in Example 1, and the plasticized compound was obtained in the form of melt-extrusion pellets.

This product was then subjected to melt spinning and stretching as in Example 1 to obtain a monofilament of 1.00 mm in diameter with excellent transparency. This monofilament has high tensile strength and flexibility with specific gravity of 1.710, tensile strength of 53.5 kg/mm$^2$, initial modulus of elasticity of 100 kg/mm2 and refractive index of 1.42 and an energy at impact rupture of 130 kg.cm.

This monofilament took only 15 seconds to sink to 5-meter in depth in the sea water, and almost no change of strength and extensibility was observed after immersion in the sea water for 48 hrs.

EXAMPLE 3

Fifteen parts by weight of poly (methyl acrylate) freeze-crushed into particles and 5 parts by weight of the polyester-plasticizer of Example 1 were mixed under a cold condition with 100 parts by weight of polyvinylidene fluoride having an inherent viscosity of 1.30 dl/g produced by suspension polymerization, to form a somewhat rough particulate composition.

This composition was melt-extruded into pellets and the pellets were subjected to melt spinning and stretching as in Example 1 to obtain a monofilament of 1.2 mm in diameter with excellent transparency. This filament had a high strength and flexibility with a specific gravity of 1.70, a tensile strength of 40 kg/mm$^2$ and an initial modulus of elasticity of 80 kg/mm$^2$ and an energy at impact rupture of 165 kg.cm.

EXAMPLE 4

Thirty parts by weight of a monomeric mixture composed of 27 parts by weight of methyl acrylate and 3 parts by weight of isobutylene were subjected to intraparticle post-polymerization within 100 parts by weight of particles of polyvinylidene fluoride of an inherent viscosity of 1.30 dl/g obtained by suspension polymerization to be globular particles of a mixture of polyvinylidene fluoride and the copolymer of methyl acrylate and isobutylene.

The thus obtained particles were mixed with polyvinylidene fluoride at a weight ratio of 65:50 to be a mixture composed of 100 parts by weight of polyvinylidene fluoride and 15 parts by weight of the copolymer of methyl acrylate and isobutylene, and the mixture was further blended with 2 parts by weight of a polyester of molecular weight of 1,600 which was produced by polycondensation of butanediol and adipic acid and had the terminal hydroxyl groups acetylated. The thus prepared resin composition was processed in the same manner as in Example 1 into monofilaments of 1.6 mm in diameter.

The thus obtained monofilament was excellent in transparency and flexibility, and showed the following properties: tensile strength of 38 kg/mm$^2$; initial modulus of elasticity of 115 kg/mm$^2$ and energy at impact rupture of 210 kg.cm

EXAMPLE 5

The same procedures of intra-particle post-polymerization were carried out as in Example 4 except for using polyvinylidene fluoride of 1.45 dl/g in inherent viscosity instead of using polyvinylidene fluoride of 1.30 dl/g in inherent viscosity in Example 4, to obtain globular particles of the mixture of the two polymers.

These particles and the plain particles of polyvinylidene fluoride were mixed at a weight ratio of 43.3:66.7 to be a mixture composed of 100 parts by weight of polyvinylidene fluoride and 10 parts by weight of the copolymer of methyl acrylate and isobutylene, and the thus obtained mixture was further mixed with 6 parts by weight of the same polyester as in Example 4 to be a resin composition.

After processing the resin composition into the melt-extruded pellets, the pellets were subjected to the same procedures as in Example 1 to be finished filaments of 1.4 mm in diameter excellent in transparency and flexibility. The physical properties of the thus obtained filament were: tensile strength of 44 kg/mm$^2$; initial modulus of elasticity of 90 kg/mm$^2$ and energy at impact rupture of 150 kg.cm.

COMPARATIVE EXAMPLE 1

The same procedures as in Example 1 were repeated, however, without incorporating any acrylate resin into the vinylidene fluoride-based resin and without blending any plasticizer, to obtain monofilaments of 0.5 mm in diameter. The thus obtained monofilament showed the following properties: tensile strength of 70 kg/mm$^2$; initial modulus of elasticity of 270 kg/mm$^2$ and energy at impact rupture of 30 kg.cm.

These data show that the filament thus prepared is unsuitable for use as fishing line because of the too large initial modulus of elasticity indicating the excessive firmness thereof and of the too small energy at impact rupture thereof.

COMPARATIVE EXAMPLE 2

The same procedures as in Example 1 were repeated, however, without incorporating any acrylate resin into the vinylidene fluoride-based resin, to obtain monofilaments of 1.2 mm in diameter. The thus obtained monofilament showed the following properties: tensile strength of 62 kg/mm$^2$; initial modulus of elasticity of 140 kg/mm$^2$ and energy at impact rupture of 135 kg.cm.

Although these data show that some improvements have been effected in the properties of the filaments as a result of an addition of the polyester plasticizer in comparison to the data of Comparative Example 1 where no plasticizer was used, the data still show that the filaments are still unsuitable for use as fishing line.

COMPARATIVE EXAMPLE 3

The same procedures as in Example 1 were repeated except for adding 12.5 parts by weight of the same polyester plasticizer instead of adding 5 parts by weight of the polyester plasticizer in Example 1 and that no acrylate resin was incorporated into the vinylidene fluoride-based resin.

In this case, much amount of bubbles were observed in the filament thus making frequent rupture of the filament. On examining the part of the filament of 1.4 mm in diameter not containing the bubbles, the tensile strength, the initial modulus of elasticity and the energy at impact rupture were 28 kg/mm$^2$; 90 kg/mm$^2$ and 120 kg.cm, respectively.

Although the initial modulus of elasticity of this filament has been improved by the use of a relatively large amount of the plasticizer, in the same time, the tensile strength was reduced with the occurrence of bubbling in melt-spinning. Namely, this recipe of resin composition is not suitable for practical production of filaments.

COMPARATIVE EXAMPLE 4

The same procedures as in Example 2 were repeated, except for adding 18 parts by weight of a copolymer of methyl acrylate and isobutylene at a weight ratio of 90:10 to 100 parts by weight of polyvinylidene fluoride instead of carrying out the intra-particle polymerization of the monomeric mixture, and for not adding any plasticizer to polyvinylidene fluoride, to prepare the filament.

In this case, the formation of bubbles in the filament was frequently observed during melt-spinning thus hindering the smooth spinning by rupture thereof. On examining the part of the filament of 0.2 mm in diameter not containing bubbles, it was shown that the tensile strength and the initial modulus of elasticity were 67 kg/mm$^2$ and 200 kg/mm$^2$, respectively.

This recipe is unsuitable for continuous preparation of filaments by the occurrence of bubbling owing to the addition of the copolymer of methyl acrylate and isobutylene not by intra-particle post-polymerization but by direct addition to polyvinylidene fluoride and to the lack of the plasticizer. From the tensile data, it is considered that the direct addition of the copolymer caused the reduction of the tensile strength of the product to the extent which makes the filament not usable as fishing line.

COMPARATIVE EXAMPLE 5

The same procedures in Comparative Example 4 except for adding 32 parts by weight of the same copolymer of methyl acrylate and isobutylene to 100 parts by weight of polyvinylidene fluoride instead of adding 18 parts by weight of the copolymer in Comparative Example 4. Also in this case as in Comparative Example 4, the formation of bubbles in the filament was frequently observed during melt-spinning thus hindering the smooth spinning by rupture. On examining the part of the filament of 1.5 mm in diameter not containing bubbles, the tensile strength, the initial modulus of elasticity and the energy of impact rupture were 25 kg/mm$^2$; 100 kg/mm$^2$ and 130 kg.cm respectively.

These data show that the thus prepared filament is unsuitable for use as fishing line, and moreover, the recipe was extremely poor for practically preparing the filament.

What is claimed is:

1. A flexible bubble-free monofilament of at least 0.08 mm in diameter, excellent in transparency, high in impact strength and durability and having a specific gravity of 1.65 to 1.83, a tensile strength of not less than 30 kg/mm$^2$ and a modulus of elasticity of 60 to 120 kg/mm$^2$, which is essentially composed of a vinylidene fluoride-based resin, a polymeric substance containing at least 85% by weight of methyl acrylate and a polyester plasticizer and is prepared by the process comprising the steps of:

melt-spinning of a resin composition consisting essentially of 100 parts by weight of said vinylidene fluoride based resin selected from homopolymers of vinylidene fluoride and copolymers thereof; 5 to 15 parts by weight of said polymeric substance selected from homopolymers of methyl acrylate, copolymers comprising at least 85% by weight of methyl acrylate units and at most 15% by weight of isobutylene units and mixture thereof; and 2 to 7 parts by weight of said polyester plasticizer selected from the group consisting of polyesters of 1,100 to 5,000 in molecular weight obtained from an alcohol of 4 to 7 carbon atoms and a carboxylic acid of 4 to 8 carbon atoms and polyesters of 1,500 to 4,000 in molecular weight obtained from a dihydric alcohol of 2 to 4 carbon atoms and a dicarboxylic acid of 4 to 6 carbon atoms, thereby obtaining an unstretched monofilament, stretching the thus obtained unstretched monofilament in a heating medium.

2. A flexible monofilament according to claim 1, wherein the thus stretched monofilament is further subjected to relaxation thereby obtaining said flexible monofilament.

3. A flexible monofilament according to claim 1, wherein said unstretched monofilament is first stretched 4.0 to 5.5 times in length within the heating medium at a temperature of 150° to 165° C., followed by an additional stretching of 1.1 to 1.2 times in length within the heating medium at a temperature of 160° to 165° C.

4. A flexible monofilament according to claim 2, wherein said stretched monofilament is subjected to relaxation of 5 to 20% in length in dry heat of 80° to 160° C.

5. A flexible monofilament of claim 1, wherein said polymeric substance is incorporated into the vinylidene fluoride-based resin by an intra-particle post-polymerization of methyl acrylate or a mixture of methyl acrylate and isobuthylene in the particle of said vinylidene fluoride-based resin.

6. A flexible monofilament of claim 1, wherein said vinylidene fluoride-based resin is a homopolymer or copolymer of vinylidene fluoride.

7. A flexible monofilament according to claim 1, wherein the amount of the said polymeric substance is more than two times by weight as much as that of the polyester plasticizer.

8. A flexible monofilament according to claim 1, in the form of a fishing line.

9. A flexible monofilament according to claim 2, in the form of a fishing line.

10. A flexible monofilament according to claim 3, in the form of a fishing line.

11. A flexible monofilament according to claim 4, in the form of a fishing line.

12. A flexible monofilament according to claim 5, in the form of a fishing line.

13. A flexible monofilament according to claim 6, in the form of a fishing line.

14. A flexible monofilament according to claim 7, in the form of a fishing line.

* * * * *